Patented Feb. 3, 1948

2,435,198

UNITED STATES PATENT OFFICE 2,435,198

COATED WELDING ELECTRODE

Frank E. Browne, Upper Darby, Pa.

No Drawing. Application January 5, 1945,
Serial No. 571,490

9 Claims. (Cl. 219—8)

(Granted under the act of March 3, 1883, as
amended April 30, 1928; 370 O. G. 757)

This invention relates to welding and more specifically to electric-arc welding of copper and copper-zinc alloys.

In general, it is an object of the invention to provide a coated copper-alloy electric-arc welding electrode which can be easily, readily, and quickly made, the constituents of which are available and relatively inexpensive, and which can be used effectively and skillfully by journeyman workmen.

Another object of the invention is to provide such an electrode, the fuming of the zinc content of which is suppressed and the zinc content of which is deposited at the point of application of the electrode with the same satisfactory resulting weld that has been obtained heretofore with the electric arc with metals and alloys other than copper-zinc alloys.

Another object is to provide an electrode coating which suppresses zinc fuming.

Other objects of the invention will in part be obvious and will in part appear hereinafter.

The invention accordingly comprises methods and articles of manufacture possessing the features, properties, and relation of elements which will be exemplified in the methods, articles, and substances hereinafter described, the scope of the application of which will be indicated in the claims.

There are occasions when electric-arc is to be preferred to torch welding (e. g., gas welding). For example, it is dangerous to introduce into a bronze ship propeller those stresses that the heat of a torch sets up over the area that a torch affects. An electric arc on the other hand affects such a small area that the stresses are relatively inconsequential. It has, however, not been possible heretofore to deposit copper-zinc alloys by electric welding. Under the conditions of temperature, etc., in the electric arc the vapor pressure of the zinc has caused it to gasify and to leave the scene of operations in clouds of zinc-oxide smoke. Not only has the zinc failed to be deposited but the high-zinc base metal upon which the zinc was to be deposited has been eaten away. Coated copper-zinc-alloy rods which worked with torch welding did not work with the electric arc.

The present invention includes a copper-zinc-alloy welding electrode which may be used with an electric arc to give an entirely satisfactory weld. There is substantially no eating away of the bronze or brass base metal beneath the deposited alloy.

The welding electrode of this invention may have a core, sometimes called a core wire, having any desired percentage of zinc, usually at least 20% of zinc. It may be of brass or it may be of manganese bronze. There is a coating on the core. It comprises, in dry mix, the following components in the ranges and preferred amounts indicated:

|  | Per Cent Range | Preferred Per Cent |
|---|---|---|
| soluble alkali silicate | 5-25 | 14 |
| alkaline earth carbonate | 3-30 | 20 |
| cryolite | 5-50 | 30 |
| cerium ore | 0-30 | 5 |
| fluorspar | 5-20 | 15 |
| carbon | 0-10 | 6 |
| ferro-silicon |  |  |
| ferro-manganese |  |  |
| ferro-chromium | 0-20 | 10 |
| ferro-molybdenum |  |  |
| manganese |  |  |

The soluble alkali silicate acts as a binder. The alkaline earth carbonate is a stabilizer, tending to minimize current fluctuations in the arc, and a shielding agent, keeping the air away from the material of the core, and a slag former. The cryolite acts as a flux. A coating of cryolite will permit a zinc alloy to be deposited but there is a tendency with manganese bronze, for example, for cold laps to appear and of the arc to flutter. The cerium ore is a flux and assists in forming slag. Fluorspar is a shielding and fluxing agent. Any one or combination of ferro-silicon, ferro-manganese, ferro-chromium and manganese may be used. They replace and add to the metal of the core and they are deoxidizers, using up oxygen which may be present in the arc. The carbon is a stabilizer and deoxidizer. The following forms are listed in order of efficiency: graphite, petroleum, coke, lampblack.

An all-weld manganese bronze specimen taken from a weld made in an electric arc with the above coated manganese bronze electrode has a tensile strength of at least 50,000 pounds per square inch and is non-dendritic and sound (i. e., non-porous in accordance with the standard specification of the National Bureau of Standards).

The invention described herein may be manufactured and used by or for the Government of the United States of America for governmental purposes without the payment of any royalties thereon or therefor.

What I claim as new and desire to secure by Letters of Patent is:

1. A welding-electrode coating comprising in dry mix about the following parts by weight: a soluble alkali silicate 3, alkaline earth carbonate 4, cryolite 6, cerium ore 1, fluorspar 3, carbon 1, and at least one of the class comprising ferro-silicon, ferro-manganese, ferro-chromium, ferro-molybdenum, and manganese 2.

2. A welding-electrode coating comprising in dry mix the following: a soluble alkali silicate about 5 to 25 per cent, alkali earth carbonate about 3 to 30 per cent, cryolite about 5 to 50 per cent, cerium ore about 5 per cent, fluorspar about 5 to 20 per cent, carbon about 6 per cent, and at least one of the class comprising ferro-silicon, ferro-manganese, ferro-chromium, ferro-molybdenum, and manganese about 10 per cent.

3. A welding electrode comprising a copper alloy core containing at least about 20 per cent zinc and a coating comprising in dry mix about the following parts by weight: a soluble alkali silicate 3, alkaline earth carbonate 4, cryolite 6, cerium ore 1, fluorspar 3, carbon 1, and at least one of the class comprising ferro-silicon, ferro-manganese, ferro-chromium, ferro-molybdenum, and manganese 2.

4. A welding electrode comprising a copper alloy core containing at least about 20 per cent zinc and a coating comprising in dry mix the following: a soluble alkali silicate about 5 to 25 per cent, alkaline earth carbonate about 3 to 30 per cent, cryolite about 5 to 50 per cent, cerium ore about 5 per cent, fluorspar about 5 to 20 per cent, carbon about 6 per cent, and at least one of the class comprising ferro-silicon, ferro-manganese, ferro-chromium, ferro-molybdenum, and manganese about 10 per cent.

5. A welding electrode comprising a copper alloy core containing at least 20% of zinc and a coating thereon comprising in dry mix about 5 to 25% of a soluble alkali silicate, about 3 to 30% of an alkaline earth carbonate, about 5 to 50% cryolite, and suitable proportions of a deoxidizer.

6. A welding electrode comprising a core of brass or manganese bronze and a coating thereon comprising in dry mix about 5 to 25% of a soluble alkali silicate, about 3 to 30% of an alkaline earth carbonate, about 5 to 50% cryolite, about 5 to 20% fluorspar, and suitable proportions of a deoxidizer.

7. A welding-electrode coating comprising in dry mix about 5 to 25% of a soluble alkali silicate, about 3 to 30% of an alkaline earth carbonate, about 5 to 50% cryolite, about 5 to 20% fluorspar, about 5% cerium ore, and suitable proportions of a deoxidizer.

8. A welding-electrode coating comprising in dry mix about 5 to 25% of a soluble alkali silicate, about 3 to 30% of an alkaline earth carbonate, a flux, and about 10% of at least one of the class comprising ferro-silicon, ferro-manganese, ferro-chromium, ferro-molybdenum, and manganese.

9. A welding-electrode coating comprising in dry mix about 5 to 25% of a soluble alkali silicate, about 3 to 30% of an alkaline earth carbonate, a flux, about 6% of carbon, and about 10% of at least one of the class comprising ferro-silicon, ferro-manganese, ferro-chromium, ferro-molybdenum, and manganese.

FRANK E. BROWNE.

REFERENCES CITED

The following references are of record in the file of this patent:

UNITED STATES PATENTS

| Number | Name | Date |
|---|---|---|
| Re. 17,631 | Lytle | Apr. 1, 1930 |
| Re. 20,102 | Miller (1) | Sept. 8, 1936 |
| 1,358,311 | Harris | Nov. 9, 1920 |
| 1,650,905 | Mills | Nov. 29, 1927 |
| 1,754,566 | Miller (2) | Apr. 15, 1930 |
| 1,839,961 | Green | Jan. 5, 1932 |
| 1,887,500 | Crampton | Nov. 15, 1932 |
| 1,931,466 | Notvest | Oct. 17, 1933 |
| 1,952,842 | Doss | Mar. 27, 1934 |
| 1,996,794 | Deppeler | Apr. 9, 1935 |
| 2,027,330 | Wilkins | Jan. 7, 1936 |
| 2,046,088 | Price | June 30, 1936 |
| 2,052,140 | Jennison | Aug. 25, 1936 |
| 2,100,545 | Hiemke | Nov. 30, 1937 |
| 2,238,392 | Matush | Apr. 15, 1941 |
| 2,312,109 | McDonald | Feb. 23, 1943 |
| 2,320,677 | Swift | June 1, 1943 |